(12) United States Patent
Adams et al.

(10) Patent No.: US 11,225,112 B2
(45) Date of Patent: Jan. 18, 2022

(54) SIDEWALL TREATMENT FOR COOLING AND AERODYNAMICS

(71) Applicant: Bridgestone Americas Tire Operations, LLC, Nashville, TN (US)

(72) Inventors: Cara E. Adams, Uniontown, OH (US); Dale R. Harrigle, Jr., Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 343 days.

(21) Appl. No.: 16/040,115

(22) Filed: Jul. 19, 2018

(65) Prior Publication Data

US 2019/0023092 A1    Jan. 24, 2019

Related U.S. Application Data

(60) Provisional application No. 62/536,051, filed on Jul. 24, 2017.

(51) Int. Cl.
*B60C 23/19* (2006.01)
*B60C 13/02* (2006.01)
*B60C 11/03* (2006.01)

(52) U.S. Cl.
CPC ............ *B60C 23/19* (2013.01); *B60C 11/032* (2013.01); *B60C 11/0327* (2013.01); *B60C 13/02* (2013.01); *B60C 2200/00* (2013.01)

(58) Field of Classification Search
CPC ......... B60C 23/18; B60C 23/19; B60C 13/00; B60C 13/001; B60C 13/02; B29D 2030/726; B29D 2030/728

(Continued)

(56) References Cited

U.S. PATENT DOCUMENTS 596,741 A  *  1/1898  Cowen ................... B60C 11/11
                                                    152/209.11
3,741,503 A      6/1973  Cabeza (Continued)

FOREIGN PATENT DOCUMENTS

DE       102010036765 A1    2/2012
EP            0240269 A2   10/1987

(Continued)

OTHER PUBLICATIONS

Shinichi Mori, JP-2010260376-A, machine translation. (Year: 2010).*

(Continued)

*Primary Examiner* — Robert C Dye
*Assistant Examiner* — Sedef E Paquette
(74) *Attorney, Agent, or Firm* — Shaun J. Fox; John M. Skeriotis

(57) ABSTRACT

Provided is a pneumatic tire comprising a tread, sidewalls, a belt, and dimpled patterns, wherein each dimpled pattern is adapted to modify air flow and temperature. The tread defines the outward surface of the tire and extends in a radial direction, a circumferential direction, and a lateral direction. Each sidewall extends radially inwardly along a curved path from the tread to a bead and defines a lateral surface having maximum lateral extent. The belt extends under the tread. Each dimpled pattern is a surface treatment etched from a sidewall maximum lateral extent over a belt edge and onto the tread. Each dimpled pattern surface treatment modifies air flow at 180 mph over the tire to turbulent flow, and reduces steady state operating temperatures of the sidewalls.

5 Claims, 2 Drawing Sheets

(58) Field of Classification Search
USPC .......................... 152/209.17, 523; D12/576
See application file for complete search history.

(56) References Cited

U.S. PATENT DOCUMENTS

| | | | |
|---|---|---|---|
| 3,773,283 | A | 11/1973 | Abplanalp |
| D293,562 | S * | 1/1988 | Fuzioka ........................ D12/576 |
| D293,563 | S * | 1/1988 | Fuzioka ........................ D12/605 |
| 4,823,856 | A | 4/1989 | Roberts |
| 5,027,876 | A * | 7/1991 | Chrobak ............... B60C 13/003 |
| | | | 152/209.14 |
| 5,203,933 | A | 4/1993 | Nagahisa |
| 5,259,431 | A | 11/1993 | Housiaux |
| D506,969 | S | 7/2005 | Thompson |
| 6,983,911 | B1 | 1/2006 | Nordquist |
| 8,381,786 | B2 | 2/2013 | Ebiko |
| D701,826 | S | 4/2014 | Morito |
| 9,038,684 | B2 | 5/2015 | Kubota |
| 9,090,130 | B2 | 7/2015 | Kojima |
| 2011/0030862 | A1 | 2/2011 | Hayashi |
| 2012/0060994 | A1 | 3/2012 | Hayashi |
| 2012/0274029 | A1 | 11/2012 | Khonsari |
| 2013/0075008 | A1 | 3/2013 | Miyajima |
| 2013/0263991 | A1 | 10/2013 | Fujii |
| 2014/0048193 | A1 | 2/2014 | Yukawa |
| 2014/0144565 | A1 | 5/2014 | Yukawa |
| 2014/0190610 | A1 | 7/2014 | Hayashi |
| 2014/0238571 | A1 | 8/2014 | Yukawa |
| 2014/0238572 | A1 | 8/2014 | Imamura |
| 2014/0305567 | A1 | 10/2014 | Mitarai |
| 2015/0000814 | A1 | 1/2015 | Mishima |
| 2015/0013868 | A1 | 1/2015 | Mishima |
| 2015/0013869 | A1 | 1/2015 | Yukawa |
| 2015/0053325 | A1 | 2/2015 | Yukawa |
| 2015/0183275 | A1 | 7/2015 | Kodama |
| 2015/0266347 | A1 | 9/2015 | Kodama |
| 2015/0290981 | A1 | 10/2015 | Berger |
| 2015/0290983 | A1 | 10/2015 | Shmagranoff |
| 2015/0328932 | A1 | 11/2015 | Steenwyk |
| 2015/0352907 | A1 | 12/2015 | Kaneko |
| 2016/0016439 | A1 | 1/2016 | Miyazono |

FOREIGN PATENT DOCUMENTS

| | | | |
|---|---|---|---|
| EP | 2960081 A1 | 12/2015 | |
| FR | 798397 A * | 5/1936 | ............ B60C 11/01 |
| FR | 2131874 A1 | 11/1972 | |
| FR | 2997900 A1 | 5/2014 | |
| GB | 2010755 A1 | 7/1979 | |
| JP | 3273910 A2 | 12/1991 | |
| JP | 6080003 A2 | 3/1994 | |
| JP | 2000016030 A2 | 1/2000 | |
| JP | 2010155576 A2 | 7/2010 | |
| JP | 2010260376 A * | 11/2010 | |
| JP | 2012116382 A2 | 6/2012 | |
| JP | 2012131254 A2 | 7/2012 | |
| JP | 5317667 B2 | 10/2013 | |
| JP | 5474444 B2 | 4/2014 | |
| WO | WO15029927 A1 | 3/2015 | |
| WO | WO15029928 A1 | 3/2015 | |
| WO | WO15029929 A1 | 3/2015 | |

OTHER PUBLICATIONS

Joseph Henri Louis Perben, FR-798397-A, machine translation. (Year: 1936).*

* cited by examiner

SIDEWALL TREATMENT FOR COOLING AND AERODYNAMICS

I. BACKGROUND

The present subject matter is directed to tires. More specifically, the present subject matter is directed to air flow modification tire surface features.

There are multiple technical challenges present in current tire technology. Some of these challenges relate to heat generation, storage, and transfer.

It remains desirable to provide tire surface technology that provides desirable modification of tire heat transfer to the surrounding air.

II. SUMMARY

Provided is a pneumatic tire comprising a tread, sidewalls, a belt, and dimpled patterns, wherein each dimpled pattern is adapted to modify air flow and temperature. The tread defines the outward surface of the tire and extends in a radial direction, a circumferential direction, and a lateral direction. Each sidewall extends radially inwardly along a curved path from the tread to a bead and defines a lateral surface having maximum lateral extent. The belt extends under the tread. Each dimpled pattern is a surface treatment etched from a sidewall maximum lateral extent over a belt edge and onto the tread. Each dimpled pattern surface treatment modifies air flow at 180 mph over the tire to turbulent flow, and reduces steady state operating temperatures of the sidewalls.

Still other benefits and advantages of the present subject matter will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
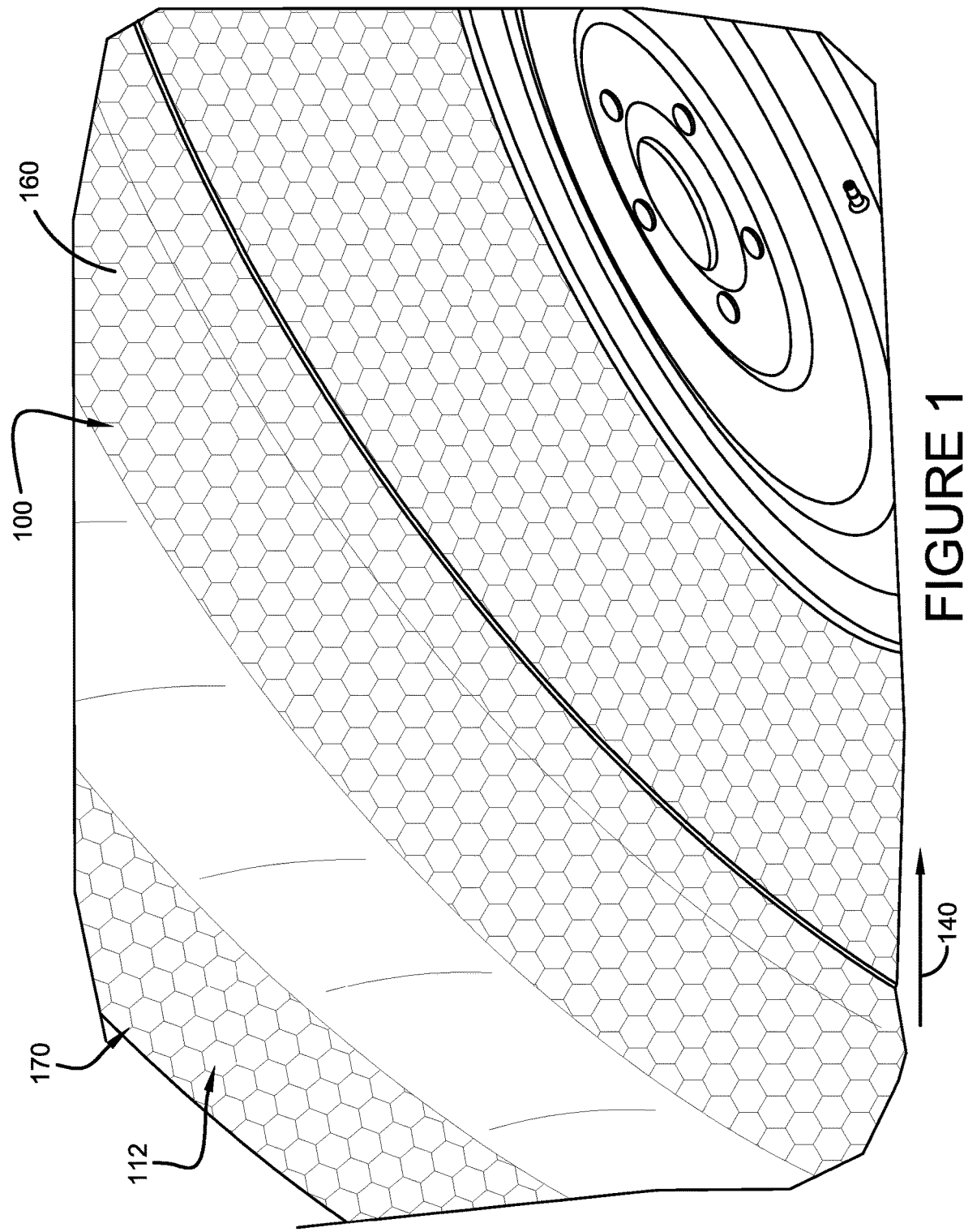
FIG. 1 is view of a first configuration of a tire having a first embodiment of a tire surface treatment.

Referring now to the drawings wherein the showings are for purposes of illustrating embodiments of the present subject matter only and not for purposes of limiting the same, and wherein like reference numerals are understood to refer to like components, provided is a tire surface treatment and a method for using same.

Figure 2:
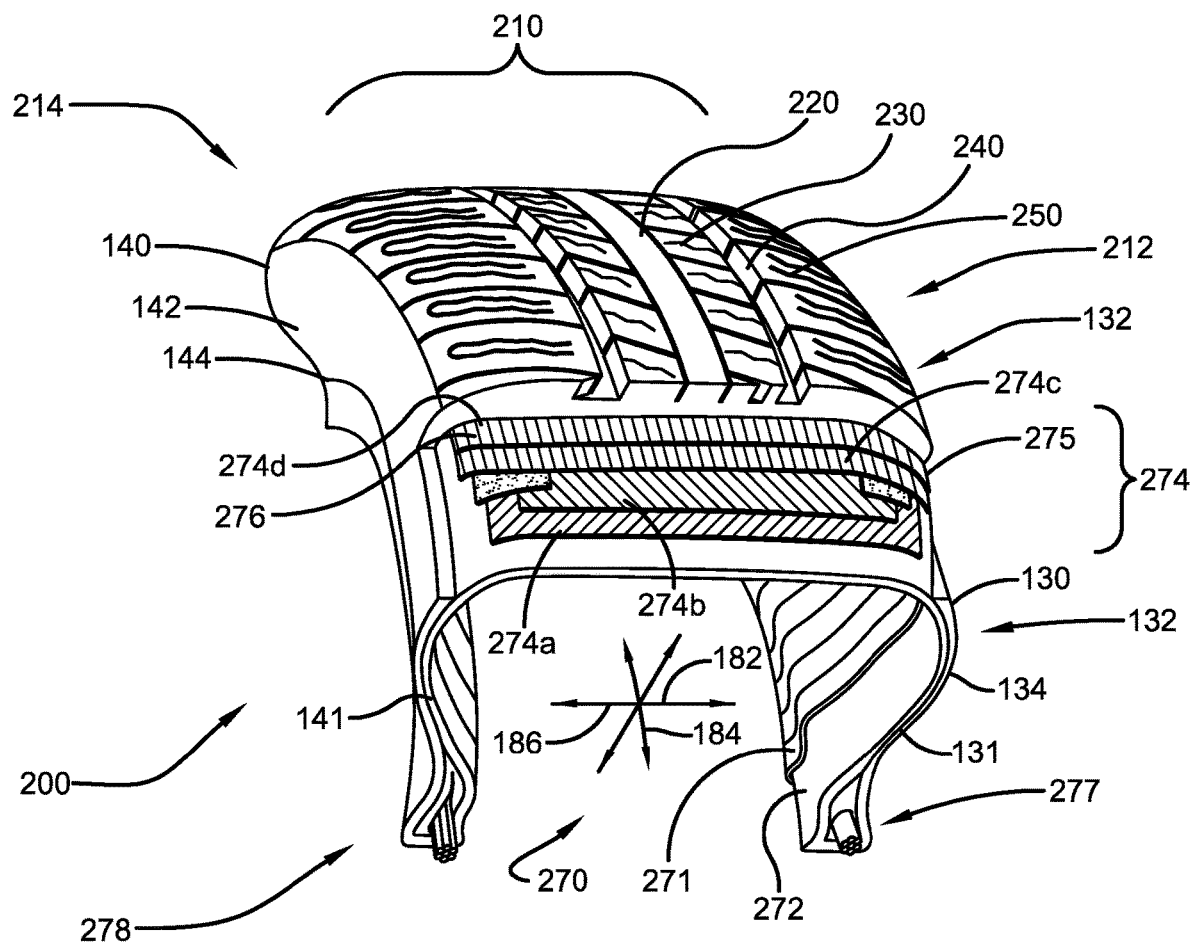
FIG. 2 is a partial isometric sectional view of a second configuration of a tire.

In a first non-limiting embodiment, may comprise a tread 210. The tread 210 may be a featureless tread or nearly featureless, conventionally known as a "slick", as shown in FIG. 1, or may optionally comprise some tread features as shown in FIG. 2. Tread feature are optional and may comprise a center rib 220, a tread block 230, a groove 240, a sipe 250, or a combination thereof. A tire 100 may have a first sidewall 130, and a second sidewall 140. A tire 100 may comprise one or more interior components 270. Interior components 270 may comprise an interliner 271, a carcass 272, a belt 274.

A tire tread 210 may define a substantially cylindrical outward surface 112 of the tire 100 in a radial direction 182, extending around the tire 100 in a circumferential direction 184, and extending in a lateral direction 186 mutually perpendicular, at any given point of tangency to the outward surface, to both the radial direction 182 and the circumferential direction 184, the tread having a first lateral side 212, and a second lateral side 214 opposite the first lateral side 212 in the lateral direction 186.

A first sidewall 130 extends radially inwardly along a curved path 131 from the first lateral side 212 of the tread 210 to a first bead 277. The first sidewall 130 defines a first lateral surface 132 having first maximum lateral extent 134.

A second sidewall 140 extends radially inwardly along a curved path 141 from the second lateral side 214 of the tread 210 to a second bead 278. The second sidewall 140 defines a second lateral surface 142 having second maximum lateral extent 144.

A belt 274 may extend under the tread 210 in the circumferential direction 184 and in the lateral direction 186 from a first belt edge 275 to a second belt edge 276. A belt 274d may extend under the tread 210 in the circumferential direction 184 and in the lateral direction 186 from a first belt edge 275 to a second belt edge 276. In some embodiments the tire 100 may comprise a plurality of belts 274a, 274b, 274c, 274d which may extend under the tread 210 in the circumferential direction 184 and in the lateral direction 186 from a first belt edge 275 to a second belt edge 276. The belts 274a, 274b, 274c, 274d may overlap one another. The belts 274a, 274b, 274c, 274d may be cover one another so that there is an outermost belt 274d, an inner most belt 274a, and one or more belts 274b, 274c interposed radially between the outermost belt 274d and the inner most belt 274a. In some embodiments there may be 1 belt, 2 belts, 3 belts, 4 belts, 5 belts, or more than 5 belts.

The tread 210 may comprises a first dimpled pattern surface treatment 160 etched around the tire 100 circumferentially, and from the first maximum lateral extent 134 radially outward and laterally inward over the first belt edge 275 and onto the tread 210. The tread may comprise a second dimpled pattern surface treatment 170 etched around the tire circumferentially, and extending from the second maximum lateral extent 144 radially outward and laterally inward over the second belt edge 276 and onto the tread 210.

Each dimpled pattern surface treatment 160, 170 is adapted to modify air flow and temperature in one or more of the following ways: (a) modify an air flow at some operational speed over the tire 100 to turbulent flow, (b) reduce steady state operating temperatures of the sidewalls by some temperature amount over that compared to steady state operating temperatures at similar operating conditions without a dimpled pattern surface treatment 160, 170, and (c) both (a) and (b). It is to be understood that a dimpled pattern surface treatment 160, 170 may be of a geometry that may modify an air flow per (a) or temperature per (b) without substantially affecting other operational performance characteristics such as handling, noise, vibration, balance, or harshness. A dimpled pattern surface treatment 160, 170 that may modify an air flow per (a) or temperature per (b) without substantially affecting other operational performance characteristics may be one that is very shallow such as less than 1.5 millimeters deep. A dimpled pattern surface treatment 160, 170 that may modify an air flow per (a) or temperature per (b) without substantially affecting other operational performance characteristics may be one that is very shallow such as less than 1.0 millimeters deep. A dimpled pattern surface treatment 160, 170 that may modify an air flow per (a) or temperature per (b) without substantially affecting other operational performance characteristics may be one that is very shallow such as less than 0.5 millimeters deep. A dimpled pattern surface treatment 160, 170 that may modify an air flow per (a) or temperature per (b) without substantially affecting other operational performance characteristics may be one that is very shallow such as less than 0.2 millimeters deep.

It should be understood that very shallow features, such as without limitation, dimpled pattern surface treatment 160, 170 less than 0.5 millimeters deep, are subject to being changed more by tire wear than would deeper features by the same amount of wear. It should be understood that very shallow features, such as without limitation, dimpled pattern surface treatment 160, 170 less than 0.5 millimeters deep, will not endure for long usage distances, however for some tires, like race tires, where the typical application is a short life and with readily maintenance, this does not present an substantial problem.

The dimpled pattern surface treatment 160, 170 is a tessellation of the surface region of interest. In some non-limiting embodiments, the dimpled pattern surface treatment 160, 170 may be a hexagonal arrangement of circular dimples. In some non-limiting embodiments, the dimpled pattern surface treatment 160, 170 may be a rectangular arrangement of circular dimples. In some non-limiting embodiments, the dimpled pattern surface treatment 160, 170 may comprise dimpled that are hexagonal shapes or square shapes or rectangular shapes or irregular shapes. In some non-limiting embodiments, the dimpled pattern surface treatment 160, 170 may comprise dimples wherein every dimple is of the same size, or shape, or same size and shape. In some non-limiting embodiments, the dimpled pattern surface treatment 160, 170 may comprise dimples of differing size, differing shape, or differing size and shape. In some non-limiting embodiments, the dimpled pattern surface treatment 160, 170 may comprise exactly two sets of dimples wherein the first set consists of dimples wherein every dimple in the first set is of the same size and shape, and wherein the second set consists of dimples wherein every dimple in the second set is of the same size and shape. In some non-limiting embodiments, the dimpled pattern surface treatment 160, 170 may comprise exactly N sets of dimples wherein the first set consists of dimples wherein every dimple in the first set is of the same size and shape, and wherein the second set consists of dimples wherein every dimple in the second set is of the same size and shape, and wherein each other set consists of dimples wherein every dimple in the set is of the same size and shape. In some non-limiting embodiments, a set of dimples are all circular, less than 0.5 millimeters deeps, and have a diameter of less than 6 millimeters. In some non-limiting embodiments, the dimpled pattern surface treatment 160, 170 may comprise two sets of dimples, where each dimple in the first set is a square having sides of a first length and a depth d, where each dimple in the second set is a square having sides of a first length and a depth of 2d, 3d, 5d, 7d, or 11d, or some other prime number multiple of d, and where the dimple sets are arranged in a Cartesian grid alternating with one another to form a "checker board" array.

In some non-limiting embodiments, a dimple may vary in area with tread depth so that the area of the dimple presented at the tread surface changes as the tire tread wears. In some non-limiting embodiments the dimpled pattern surface treatment 160, 170 may comprise two sets of dimples, where each dimple in the first set varies in area with tread depth so that the area of each dimple in the first set presented at the tread surface decreases as the tire tread wears, and where each dimple in the second set is constant in area with tread depth so that the area of each dimple in the second set presented at the tread surface is constant as the tire tread wears.

It should be understood that use of a tire having dimpled pattern surface treatment 160, 170 on the tread surface works well in applications in which the tread is fully exposed to the surrounding environmental air such as, without limitation, in situations in which the tire is mounted and driven on a car having exposed tires such as a conventional Indy car. By works well it is meant that the tires with such features experience the desired cooling and reduced steady state operating temperatures. In contrast to applications in which the tread is fully exposed to the surrounding environmental air, there are application in which the tire is shrouded, such as by a wheel well or other covering obstructing free flow of surrounding environmental air over the tire.

In some application, such as and without limitation, Indy Car racing, the tire may be operationally engaged with an associated in such a way that the tire operates at substantial negative camber angle. While not all tires are adapted for safe sustained operation at substantial negative camber angle, some tires may be so adapted. In some non-limiting embodiments the tire 100 may be a race tire adapted for safe sustained operation at camber angles below −2 degrees. In some non-limiting embodiments the tire 100 may be a race tire adapted for safe sustained operation at camber angles below −4 degrees. In some non-limiting embodiments the tire 100 may be a race tire adapted for safe sustained operation at camber angles below −6 degrees. In some non-limiting embodiments the tire 100 may be a race tire adapted for safe sustained operation at camber angles below −8 degrees. In embodiments wherein the tire operates at substantial negative camber angle, the wear in the tread adjacent the shoulder may be greatly reduced over that of embodiments wherein the tire operates at higher, that is more positive, camber angle. Such reduction in wear may prolong the life of dimpled pattern surface treatments.

Regarding modification of air flow 104, at some operational speed, air flow 104 over the tire 100 is modified to turbulent flow, it should be understood that air flow 104 over the tire 100 during operation may occur as a result of surrounding air moving with respect to the ground or roadway, or the tire moving along the ground or roadway in the course of normal operation and through the surrounding air, or a combination thereof. Conditions in which air flow 104 results only from the tire 100 moving along the ground and where the air is not moving with respect to the ground may be referred to herein as windless conditions. An air flow 104, or any fluid flow, may be laminar, turbulent, or transitional. The nature of an air flow as laminar, turbulent or transitional may be characterized by the Reynolds number of the air flow. A dimpled pattern surface treatment 160, 170 on a tire 100 may induce the air flow to transition from laminar to turbulent flow over the tire 100 at an air flow speed lower than that at which the transition would occur without the dimpled pattern surface treatment 160, 170. The effect of such a dimpled pattern surface treatment 160, 170 on a tire 100 may, accordingly, be described in terms of the speed of the air flow over the tire at which the air becomes turbulent. In some embodiments, a dimpled pattern surface treatment 160, 170 on a tire 100 may modify an air flow at a speed between 20 mph and 220 mph inclusive over the tire 100 to turbulent flow. In some embodiments, a dimpled pattern surface treatment 160, 170 on a tire 100 may modify an air flow at 20 mph over the tire 100 to turbulent flow. In some embodiments, a dimpled pattern surface treatment 160, 170 on a tire 100 may modify an air flow at 80 mph over the tire 100 to turbulent flow. In some embodiments, a dimpled pattern surface treatment 160, 170 on a tire 100 may modify an air flow at 120 mph over the tire 100 to turbulent flow. In some embodiments, a dimpled pattern surface treatment 160, 170 on a tire 100 may modify an air flow at 160 mph over the tire 100 to turbulent flow. In some embodiments, a dimpled pattern surface treatment 160, 170 on a tire 100 may modify an air flow at 200 mph over the tire 100 to turbulent flow. In some embodiments, a dimpled pattern surface treatment 160, 170 on a tire 100 may modify an air flow at 220 mph over the tire 100 to turbulent flow.

It is to be understood that not all tires are adapted for safe sustained operation at the speeds common in automotive racing, but some tires, such as without limitation Indy Car race tires, may be so adapted. In some non-limiting embodiments, the tire 100 may be a race tire adapted for safe sustained operation at speeds in excess of 180 mph. In some non-limiting embodiments, the tire 100 may be a race tire adapted for safe sustained operation at speeds in excess of 190 mph. In some non-limiting embodiments, the tire 100 may be a race tire adapted for safe sustained operation at speeds in excess of 200 mph. In some non-limiting embodiments, the tire 100 may be a race tire adapted for safe sustained operation at speeds in excess of 210 mph. The speed rating of a tire is representative of the speed for which it is adapted for safe sustained operation. For sake of illustration, and not limitation, some tires have a W speed rating which signifies a maximum speed capability for safe sustained operation in excess of 168 mph. It is rare for commercial passenger and light truck tires to have very high speed rating or to be adapted for safe sustained operation at high speeds such as speeds in excess of 180 mph.

Regarding reducing steady state operating temperatures of the sidewalls 130, 140 by some temperature amount over that compared to steady state operating temperatures at similar operating conditions without a dimpled pattern surface treatment 160, 170, it should be understood that given components of a given tire 100 operating under a given constant set of conditions will eventually reach some steady state operating temperature. This steady state operating temperature may, for given components of a given tire 100 operating under a given set of conditions, be lowered by the inclusion of dimpled pattern surface treatments 160, 170 on the given tire. The effect of such a dimpled pattern surface treatment 160, 170 on a tire 100 may, accordingly, be described in terms of the change in the steady state operating temperature of the given components of tire at some set of operational conditions.

In some embodiments, a dimpled pattern surface treatment 160, 170 on a tire 100 may reduce the steady state operating temperature of the sidewalls 130, 140 of tire 100 by up to 9 degrees Fahrenheit when the tire is operated at speeds in excess of 200 mph under windless conditions. In some embodiments, a dimpled pattern surface treatment 160, 170 on a tire 100 may reduce the steady state operating temperature of the sidewalls 130, 140 of tire 100 by at least 3 degrees Fahrenheit when the tire is operated between 179.5 mph and 180.5 mph under windless conditions. In some embodiments, a dimpled pattern surface treatment 160, 170 on a tire 100 may reduce the steady state operating temperature of the sidewalls 130, 140 of tire 100 by 6 degrees Fahrenheit when the tire is operated between 199.5 mph and 200.5 mph under windless conditions. In some embodiments, a dimpled pattern surface treatment 160, 170 on a tire 100 may reduce the steady state operating temperature of the sidewalls 130, 140 of tire 100 by 9 degrees Fahrenheit when the tire is operated between 218.5 mph and 219.5 mph under windless conditions.

A method of using a pneumatic tire may comprise providing a pneumatic tire of a first embodiment; operatively engaging the pneumatic tire of the first embodiment with an associated vehicle; causing an air flow over the pneumatic tire of the first embodiment and the associated vehicle by operating the associated vehicle under a first given set of operating conditions including a speed at or above 180 mph; using one or more dimpled pattern surface treatments on the pneumatic tire of the first embodiment to modify the air flow over the tire and to associated vehicle components downstream from the tire to a turbulent flow; using the turbulent flow to cool the sidewalls of the tire by at least 7 degrees more than a laminar flow would cool the tire under the first given set of operating conditions. Without limitation, in certain embodiments, of a method of using a pneumatic tire, the pneumatic tire of a first embodiment may have a tread defining the outward surface of the tire in a radial direction, extending around the tire in a circumferential direction, extending in a lateral direction mutually perpendicular to both the radial direction and the circumferential direction, the tread having a first lateral side, and a second lateral side opposite the first lateral side in the lateral direction. In the method of using a pneumatic tire, the pneumatic tire of a first embodiment may have a first sidewall extending radially inwardly along a curved path from the first side of the tread, to a first bead, the first sidewall defining a first lateral surface having first maximum lateral extent. In the method of using a pneumatic tire, the pneumatic tire of a first embodiment may have a second sidewall extending radially inwardly along a curved path from the second side of the tread, to a second bead, the second sidewall defining a second lateral surface having second maximum lateral extent. In the method of using a pneumatic tire, the pneumatic tire of a first embodiment may have a belt extending under the tread in the circumferential direction and in the lateral direction from a first belt edge to a second belt edge. In the method of using a pneumatic tire, the pneumatic tire of a first embodiment may have a first dimpled pattern surface treatment etched around the tire circumferentially, and from the first maximum lateral extent radially outward and laterally inward over the first belt edge and onto the tread; a second dimpled pattern surface treatment etched around the tire circumferentially, and extending from the second maximum lateral extent radially outward and laterally inward over the second belt edge and onto the tread, and each dimpled pattern surface treatment may be adapted to modify air flow and temperature in the following ways: modify an air flow over the tire at speeds between 80 and 200 mph to turbulent flow, and reduce steady state operating temperatures of the sidewalls by at least 7 degrees Fahrenheit when the tire is operated at 200 mph or greater under windless conditions.

A method of using a vehicle-tire system may comprise providing an open wheel vehicle; operationally engaging a race tire with the vehicle at a camber angle less than −4 degrees; wherein the tire is engaged with the vehicle in such a way that as to permit free flow of atmospheric air over the tire; driving the vehicle at speeds in excess of 180 mph to induce a first air flow over the tire-vehicle system; causing an air flow over the tire by operating the tire under a first given set of operating conditions including a speed at or above 180 mph; using one or both dimpled pattern surface treatments to modify the air flow over the tire to a turbulent flow; using the turbulent flow to cool the sidewalls of the tire by at least 7 degrees more than a laminar flow would cool the tire under the first given set of operating conditions. In some non-limiting embodiments of a method of using a vehicle-tire system, the race tire may be a tire having a tread defining a circumference and having a first lateral side and a second lateral side opposite the first lateral side; a first sidewall engaged with the first lateral side of the tread; a second sidewall engaged with the second lateral side of the tread; a belt extending under the tread, the belt having a first belt edge under the first lateral side of the tread, and a second belt edge under the first lateral side of the tread; a first dimpled pattern surface treatment etched around the tire circumferentially and extending from the first sidewall to a region on the tread over the first belt edge; a second dimpled pattern surface treatment etched around the tire circumferentially and extending from the second sidewall to a region on the tread over the second belt edge; wherein the first dimpled pattern surface treatment is adapted to modify air flow modify an air flow over the tire at or below at 180 mph to turbulent flow, to reduce steady state operating temperatures of the sidewalls of the tire while operating at or below at 180 mph by at least 7 degrees Fahrenheit; and wherein the second dimpled pattern surface treatment is adapted to modify air flow modify an air flow over the tire at or below at 180 mph to turbulent flow, to reduce steady state operating temperatures of the sidewalls of the tire while operating at or below at 180 mph by at least 7 degrees Fahrenheit.

Testing Information Follows:

Testing was done on two sets of left front position Indianapolis-Superspeedway Construction IndyCar tires on a DW12 IndyCar. Tested tires were an Indianapolis control tire and an identical construction and compound test tire, other than the added dimpled features, dimpled pattern surface treatment 160, 170. Both tires were operated on the same IndyCar with the same day with the same installation conditions (left front condition, identical race-level camber and aerodynamic configuration, the same ambient conditions, 76 degrees Fahrenheit, at the same speeds, 219.1+/− 0.2 mph, for the same number of laps, 7 laps. Upon returning from test driving the temperature of each tire was measured with FLIR camera and at similar upper sidewall regions on the tires (the tread-sidewall junction). The test tire temperature was 118 degrees Fahrenheit, while the control tire temperature was 127 degrees Fahrenheit. It should be noted that the Indy car on which testing was performed is an open wheel car: the wheels and tires are fully exposed to the surrounding environmental air flow during driving.

Testing was evaluated by Helio Castroneves, professional IndyCar racing driver, and in his professional opinion the test features, dimpled pattern surface treatment 160, 170, produced no discernible subjective differences in the operational performance of the vehicle as evidenced by vehicle balance, handling, noise, or vibration.

TABLE I

| Tire | Temperature at Tread-Sidewall Junction (° F.) | Lap Speed (mph) | Number of Laps | Ambient Air Temperature (° F.) |
| --- | --- | --- | --- | --- |
| Control | 127 | 218.9 | 7 | 76 |
| Textured | 118 | 219.3 | 7 | 76 |

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

We claim:
1. A pneumatic tire comprising:
a tread
defining an outward surface of the tire in a radial direction,
extending around the tire in a circumferential direction,
extending in a lateral direction mutually perpendicular to both the radial direction and the circumferential direction,
the tread having
a first lateral side, and
a second lateral side opposite the first lateral side in the lateral direction;
a first sidewall extending radially inwardly along a curved path
from the first lateral side of the tread,
to a first bead,
the first sidewall defining a first lateral surface having a first maximum lateral extent a second sidewall extending radially inwardly along a curved path
from the second lateral side of the tread,
to a second bead,
the second sidewall defining a second lateral surface having a second maximum lateral extent;
a belt extending under the tread in the circumferential direction and in the lateral direction from a first belt edge to a second belt edge;
a first dimpled pattern surface treatment etched
around the tire circumferentially, and
from the first maximum lateral extent radially outward and laterally inward over the first belt edge and onto the tread; and
a second dimpled pattern surface treatment etched
around the tire circumferentially, and
extending from the second maximum lateral extent radially outward and laterally inward over the second belt edge and onto the tread; and
wherein:
1) each dimpled pattern surface treatment is adapted to modify temperature in the following way: reduce steady state operating temperatures of the sidewalls by at least 3 degrees Fahrenheit when the tire is operated at 180 mph or greater under windless conditions;
2) the tire is a race tire adapted for safe sustained operation at speeds in excess of 180 mph
3) the tread is partially a slick; and
4) the race tire is adapted for safe sustained operation at camber angles below −4 degrees.
2. The pneumatic tire of claim 1, wherein each dimpled pattern surface treatment is adapted to modify air flow and temperature in the following ways:
(a) modify an air flow over the tire at speeds between 100 and 200 mph to turbulent flow, and
(b) reduce steady state operating temperatures of the sidewalls by at least 8 degrees Fahrenheit when the tire is operated at 200 mph or greater under windless conditions.
3. The pneumatic tire of claim 1, wherein each dimpled pattern surface treatment is adapted to modify air flow and temperature in the following ways:
(a) modify an air flow over the tire at speeds between 150 and 200 mph to turbulent flow, and

(b) reduce steady state operating temperatures of the sidewalls by at least 9 degrees Fahrenheit when the tire is operated at 218 mph or greater under windless conditions.

4. The pneumatic tire of claim 1, wherein each dimpled pattern surface treatment comprises a plurality of dimples less than 0.5 millimeter deep.

5. The pneumatic tire of claim 1, wherein all dimples are:
less than 0.5 millimeter deep;
circular; and
have a diameter of less than 6 millimeters.

\* \* \* \* \*